Patented Dec. 8, 1931

1,835,396

UNITED STATES PATENT OFFICE

RICHARD HERZ, OF FRANKFORT-ON-THE-MAIN, AND WERNER ZERWECK, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR PURIFYING VAT DYESTUFFS OF THE ANTHANTHRONE SERIES

No Drawing. Application filed July 17, 1929, Serial No. 379,062, and in Germany July 23, 1928.

Our present invention relates to a process of purifying vat dyestuffs of the anthanthrone series. An advantageous method of chlorinating anthanthrone consists in carrying out the chlorination in the presence of a sulfuric acid of about 85–95% strength. This process allows to isolate the chlorinated anthanthrone in the form of an insoluble sulfate.

Now we have found that such sulfates can be generally obtained from halogenated anthanthrones and that the preparation, isolation and decomposition of these compounds can be used for purifying halogenated anthanthrones.

These sulfates are violetish black crystallized substances soluble in concentrated sulfuric acid to dark green solutions, insoluble in sulfuric acid of less strength (say 80–95%). Their chemical constitution is not exactly known, probably they are oxonium salts. They are hydrolyzed by means of water and converted thereby to the corresponding halogenated anthanthrones.

Our present purifying process is performed in the following manner: A halogenated anthanthrone produced in any way is dissolved in concentrated or fuming sulfuric acid and the solution is diluted by means of water to form sulfuric acid of about 80–95% strength. Thereby the sulfate of the dyestuff applied crystallizes, whereas the impurities originally contained in the dyestuff remain in solution. In some cases it is sufficient to grind the impure dyestuffs with sulfuric acid of 80–95% strength. During this operation the dyestuffs are converted into the corresponding insoluble sulfates, the impurities becoming dissolved. The separation of the sulfate from the sulfuric acid mother liquor is effected in the customary manner, e. g. by filtration or centrifugation. Thereafter the sulfate is hydrolyzed by treating it with water.

This purifying process may be also combined with the production of the halogenated anthanthrones. When for instance the halogenation is carried out in the presence of concentrated or fuming sulfuric acid, the reaction mass may be diluted with such an amount of water, that a sulfuric acid of about 80–95% strength is formed. The mixture is allowed to stand, the sulfate crystallized is isolated and decomposed in the above mentioned manner.

The dyestuffs thus purified are distinguished by a special clearness and brightness of their shades.

In order to further illustrate our invention the following examples are given, the parts being by weight and all temperatures in centigrade degrees. But we wish it to be understood that we are not limited to the particular conditions nor specific products mentioned therein.

Example 1

Anthanthrone is treated with gaseous chlorine with addition of a carrier such as iodine. 1 part of the chlorination product thus obtained is dissolved in about 10 parts of concentrated sulfuric acid. Then water is added until a sulfuric acid of about 90% strength is formed and the mass is allowed to stand. When cool the product, precipitated in violetish black crystals, is separated from the solution containing the by-products by filtration or centrifugation. The residue is washed with a sulfuric acid of about 85% strength until the washing liquor remains colorless, and introduced in water whereby the sulfate is decomposed. The precipitate is again filtered, washed till free from the acid and dried. The dyestuff thus obtained is distinguished by a great purity and dyes cotton brilliant yellowish orange shades of an excellent fastness.

Example 2

Anthanthrone is brominated in the presence of nitrobenzene at a temperature of 90 about 160° C. The bromination product is ground in a ball mill with about the tenfold quantity of sulfuric acid of about 90% strength. The crystalline violetish black sulfate remaining is separated from the sulfuric acid containing the impurities by means of a suitable centrifugating apparatus. Then it is worked up as described above. The dyestuff thus obtained yields dyeings distinguished by a special brightness and purity.

*Example 3*

Anthanthrone is brominated in fuming sulfuric acid in the presence of iodine at about 60°. The reaction mass is diluted by adding water until a sulfuric acid of about 85–90% strength results. The precipitated sulfate which shows similar properties as the sulfates of the foregoing examples is separated from the sulfuric acid containing the impurities and the precipitate is treated with water as described in Example 1.

The dyestuff thus obtained is distinguished by a special brightness and clearness of its shades.

*Example 4*

Anthanthrone is brominated in fuming sulfuric acid in the presence of some iodine at about 60° C., then the mass is cooled and chlorinated by introducing chlorine until one atom of chlorine has entered the molecule. To the solution of the chloro-bromo-anthanthrone thus obtained water is added while cooling and stirring until a sulfuric acid of 85–90% strength results. The sulfate precipitated is separated from the sulfuric acid containing the impurities and decomposed in the manner explained in the foregoing examples. Thereby a dyestuff is obtained which produces especially bright orange shades.

We claim:

1. A process which comprises treating a halogenated anthanthrone with sulfuric acid of 80–95% strength, separating the unsoluble sulfate from the mother liquor and decomposing the sulfate by means of water.

2. A process which comprises treating a brominated anthanthrone with sulfuric acid of 80–95% strength, separating the unsoluble sulfate from the mother liquor and decomposing the sulfate by means of water.

3. A process which comprises diluting a sulfuric acid solution of a halogenated anthanthrone with water until a sulfuric acid of 80–95% strength is formed, separating the unsoluble sulfate from the mother liquor and decomposing the sulfate by means of water.

4. A process which comprises diluting a sulfuric acid solution of a brominated anthanthrone with water until a sulfuric acid of 80–95% strength is formed, separating the unsoluble sulfate from the mother liquor and decomposing the sulfate by means of water.

5. As a new product dibromo-anthanthrone sulfate being a violetish black crystallized substance, soluble in concentrated sulfuric acid to a dark green solution, insoluble in sulfuric acid of 80–95% strength, capable of being hydrolyzed by means of water and converted thereby to dibromo-anthanthrone.

In testimony whereof, we affix our signatures.

RICHARD HERZ.
WERNER ZERWECK.